US012518477B1

(12) United States Patent
Wen et al.

(10) Patent No.: US 12,518,477 B1
(45) Date of Patent: Jan. 6, 2026

(54) CONTROLLABLE THREE-DIMENSIONAL OBJECT GENERATION

(71) Applicant: Electronic Arts Inc., Redwood City, CA (US)

(72) Inventors: Yangming Wen, Newark, CA (US); Harold Henry Chaput, Castro Valley, CA (US); Han Liu, Millbrae, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 178 days.

(21) Appl. No.: 18/128,986

(22) Filed: Mar. 30, 2023

(51) Int. Cl.
| *G06T 17/00* | (2006.01) |
| *G06T 13/80* | (2011.01) |
| *G06T 15/00* | (2011.01) |
| *G06V 10/82* | (2022.01) |

(52) U.S. Cl.
CPC .............. *G06T 17/00* (2013.01); *G06T 13/80* (2013.01); *G06T 15/00* (2013.01); *G06V 10/82* (2022.01)

(58) Field of Classification Search
CPC ......... G06T 17/00; G06T 13/80; G06T 15/00; G06V 10/82
See application file for complete search history.

(56) References Cited

U.S. PATENT DOCUMENTS

| 10,586,369 | B1 * | 3/2020 | Roche ..................... G10L 13/00 |
| 12,198,290 | B1 * | 1/2025 | Narayanan ............... G06T 7/194 |
| 2019/0004694 | A1 * | 1/2019 | Lu .......................... G06F 3/0304 |
| 2020/0019807 | A1 * | 1/2020 | Ma .......................... G06V 10/454 |
| 2022/0156987 | A1 * | 5/2022 | Chandran ............... G06N 3/047 |
| 2023/0092766 | A1 * | 3/2023 | Vodrahalli ............. G16H 50/50 382/128 |
| 2023/0368031 | A1 * | 11/2023 | Xuan ..................... G06N 3/0464 |
| 2024/0005593 | A1 * | 1/2024 | Yu ............................ G06T 19/20 |
| 2024/0177387 | A1 * | 5/2024 | Smith ........................ G06T 7/20 |

(Continued)

OTHER PUBLICATIONS

Paschalidou, Despoina, et al., ATISS: Autoregressive Transformers for Indoor Scene Synthesis, 35th Conference NeurIPS, arXiv:2110.03675v1, 33 pages, dated Oct. 7, 2021.

(Continued)

*Primary Examiner* — Xiao M Wu
*Assistant Examiner* — Latrell Anthony Creary
(74) *Attorney, Agent, or Firm* — Gray Ice Higdon

(57) ABSTRACT

Implementations disclosed herein are directed to using a machine learning model to generate three-dimensional models of objects. In some implementations, a computer implemented method can include the steps of: generating, by a machine-learning model, a three-dimensional model of an object from a three-dimensional model of an initial object and conditional input(s) specifying target properties of the generated object; generating two-dimensional image(s) of the generated object from the three-dimensional model of the generated object; generating a respective image embedding for each of the two-dimensional image(s) of the generated object using an image embedding model; generating a respective conditional embedding for each of the conditional input(s); and updating parameters of the machine-learning model based on a comparison of the respective conditional embedding for each of the conditional input(s) and the respective image embeddings for each of the two-dimensional image(s) of the generated object.

18 Claims, 8 Drawing Sheets

(56) References Cited

U.S. PATENT DOCUMENTS

2024/0290054 A1* 8/2024 Yin .................... G06N 3/0475
2024/0378837 A1* 11/2024 Wang .................... G06T 19/20

OTHER PUBLICATIONS

Wang, Xinpeng, et al., SceneFormer: Indoor Scene Generation with Transformers, arXiv:2012.09793v2, 16 pages, dated Apr. 2, 2021.
Kato, Hiroharu, et al., Differentiable Rendering: A Survey, Journal of Latex Class Files, vol. 14, No. 8, Aug. 2015, arXiv:2006.12057v2, 20 pages, dated Jul. 31, 2020.
Radford, Alec, et al., Learning Transferable Visual Models from Natural Language Supervision, arXiv:2103.00020v1, 48 pages, dated Feb. 26, 2021.
Rao, Yongming, et al., DenseCLIP: Language-Guided Dense Prediction with Context-Aware Prompting, arXiv:2112.01518v2, 11 pages, dated Mar. 21, 2022.
Xu, Hu, et al., VideoCLIP: Contrastive Pre-training for Zero-shot Video-Text Understanding, arXiv:2109.14084v2, 14 pages, dated Oct. 1, 2021.

* cited by examiner

CONTROLLABLE THREE-DIMENSIONAL OBJECT GENERATION

FIELD

The specification describes systems, methods and apparatus for using a machine learning model to generate three-dimensional models of objects.

BACKGROUND

Designing three-dimensional models of objects for use in animation or computer games is a time consuming process. Often, a user is required to manual edit properties of the model. For example, designers need to design the room by manually choosing the assets and iteratively placing the category, orientation, location and so on, to get a plausible 3D room layouts and scenes. Thus, designing the rules of placement is complicated. As another example, when creating animations, an animator may have to manually edit the motion of an object segment-by-segment.

SUMMARY

According to a first aspect of this specification, there is described a computer implemented method comprising: generating, by a machine-learning model, a three-dimensional model of an object from a three-dimensional model of an initial object and one or more conditional inputs specifying target properties of the generated object, wherein the one or more conditional inputs comprises an image and/or a text description; generating one or more two-dimensional images of the generated object from the three-dimensional model of the generated object using a differentiable renderer; generating a respective image embedding for each of the one or more two-dimensional images of the generated object using an image embedding model; generating a respective conditional embedding for each of the one or more conditional inputs using one or more embedding models, wherein the respective conditional embeddings for each of the one or more conditional inputs and respective image embeddings for each of the one or more two-dimensional images of the generated object occupy a shared latent space; and updating parameters of the machine-learning model based on a comparison of the respective conditional embedding for each of the one or more conditional inputs and the respective image embeddings for each of the one or more two-dimensional images of the generated object.

Updating parameters of the machine-learning model based on a comparison of the respective conditional embedding for each of the one or more conditional inputs and the respective image embeddings for each of the one or more two-dimensional images of the generated object may comprise: determining a loss between the conditional embeddings and the image embeddings for each of the one or more two-dimensional images of the generated object using an objective function; and determining parameter updates to the parameters of the machine-learning model based on the objective function. The objective function may comprise one or more sematic similarity losses. The conditioning input may comprises an image and a text description. The objective function may comprise: a text semantic similarity loss; and an image sematic similarity loss. The objective function may further comprises a style loss between the conditioning image and the one or more two-dimensional images of the generated object. The loss function may comprise a weighted sum of the one or more sematic similarity losses and the style loss.

The method may further comprise further comprising iterating the method until a threshold condition is satisfied.

The one or more conditional inputs may comprise a text input describing an edit to the three-dimensional model of the initial object. The three-dimensional model of the object may comprise an edited version of the three-dimensional model of the initial object with the described edit.

The initial three-dimensional model may be an environment. The one or more conditional inputs may comprises a text input describing an environment layout. The one or more conditional inputs may further comprises an asset library comprising three-dimensional models of potential objects in the environment. The three-dimensional model of the object may comprise a further environment with the environment layout described in the text input.

The initial three-dimensional model may comprise a plurality of three-dimensional human models. The one or more conditional inputs may comprise a text input describing an action. The three-dimensional model of the object may comprises a three-dimensional animation of a human performing the action. Generating one or more two-dimensional images of the generated object from the three-dimensional model of the generated object using the differentiable renderer may comprise generating one or more two-dimensional animations of the human performing the action.

According to a further aspect of this specification, there is described apparatus comprising: one or more processors; and a memory, the memory storing computer readable instructions that, when executed by the on more processors causes the apparatus to perform a method comprising: generating, by a machine-learning model, a three-dimensional model of an object from a three-dimensional model of an initial object and one or more conditional inputs specifying target properties of the generated object, wherein the one or more conditional inputs comprises an image and/or a text description; generating one or more two-dimensional images of the generated object from the three-dimensional model of the generated object using a differentiable renderer; generating a respective image embedding for each of the one or more two-dimensional images of the generated object using an image embedding model; generating a respective conditional embedding for each of the one or more conditional inputs using one or more embedding models, wherein the respective conditional embeddings for each of the one or more conditional inputs and respective image embeddings for each of the one or more two-dimensional images of the generated object occupy a shared latent space; and updating parameters of the machine-learning model based on a comparison of the respective conditional embedding for each of the one or more conditional inputs and the respective image embeddings for each of the one or more two-dimensional images of the generated object.

Updating parameters of the machine-learning model based on a comparison of the respective conditional embedding for each of the one or more conditional inputs and the respective image embeddings for each of the one or more two-dimensional images of the generated object may comprise: determining a loss between the conditional embeddings and the image embeddings for each of the one or more two-dimensional images of the generated object using an objective function; and determining parameter updates to the parameters of the machine-learning model based on the objective function. The objective function may comprise one or more sematic similarity losses. The conditioning input may comprises an image and a text description. The objective function may comprise: a text semantic similarity loss; and an image sematic similarity loss. The objective function may further comprises a style loss between the conditioning image and the one or more two-dimensional images of the generated object. The loss function may comprise a weighted sum of the one or more sematic similarity losses and the style loss.

The method may further comprise further comprising iterating the method until a threshold condition is satisfied.

The one or more conditional inputs may comprise a text input describing an edit to the three-dimensional model of the initial object. The three-dimensional model of the object may comprise an edited version of the three-dimensional model of the initial object with the described edit.

The initial three-dimensional model may be an environment. The one or more conditional inputs may comprises a text input describing an environment layout. The one or more conditional inputs may further comprises an asset library comprising three-dimensional models of potential objects in the environment. The three-dimensional model of the object may comprise a further environment with the environment layout described in the text input.

The initial three-dimensional model may comprise a plurality of three-dimensional human models. The one or more conditional inputs may comprise a text input describing an action. The three-dimensional model of the object may comprises a three-dimensional animation of a human performing the action. Generating one or more two-dimensional images of the generated object from the three-dimensional model of the generated object using the differentiable renderer may comprise generating one or more two-dimensional animations of the human performing the action.

According to a further aspect of this specification, there is described a computer implemented method comprising: inputting, into a machine-learned model, input data comprising an initial three-dimensional model of an object and one or more conditional inputs specifying one or more target properties, wherein the one or more conditional inputs comprises an image and/or a text description; processing, by machine-learned model and based on a set of learned parameters, the input data to generate an output three-dimensional model of an object with the target properties; and outputting, from the machine-learning model, the output three-dimensional model of the object with the target properties.

The method may further comprise rendering the output three-dimensional model of the object with the target properties into one or more two-dimensional images using a differentiable renderer.

DETAILED DESCRIPTION

This specification describes systems, methods and apparatus that can output a 3D model, or sequence of 3D models, for use by artists or designers, based on a text description and/or by supplying one or more reference images. For example, if the user provided a picture of an airplane and added the text "a glider in wood with light colour", optionally providing an image of a wood texture, a 3D model of a glider textured in wood in would be produced. In this manner, a designer would not need to manually edit the vertex shader or different kinds of texture mapping to generate artistic 3D objects.

The output 3D object is conditioned on a prompt text or images. A controllable 3D generation/editing network is used to generate the artistic mesh by using knowledge learning from a pre-trained joint text and image embedding space, for example using techniques associated with Contrastive Language-Image Pre-Training (CLIP). A semantic similarity loss and/or style-loss (e.g. with gram-matrix loss between the style & output images) may be used during training. The designer can freely set the any conditional inputs, such as different style images or descriptor, as controllable factor to guide the 3D object generation.

The 3D object generation/editing systems, methods and apparatus described herein may be applied to the generation/editing of many types of 3D objects. For example, the systems, methods and apparatus described herein may be used to generate artistic models from images and text. Alternatively, the systems, methods and apparatus described herein may be used to generate 3D environments/scenes, e.g. room layouts, from text, images and a library of 3D model assets (e.g. furniture). Alternatively, the systems, methods and apparatus described herein may be used to edit a pre-existing 3D model based on a text description of the desired alterations.

The systems, methods and apparatus described herein may be used to generate/edit static 3D models. Alternatively, the systems, methods and apparatus described herein may be used to generate/edit 3D animations (e.g. a sequence of 3D models).

Once generated, the 3D models may be used as in-game assets for computer games and/or used to generate 2D images or animations using a renderer.

Figure 1:
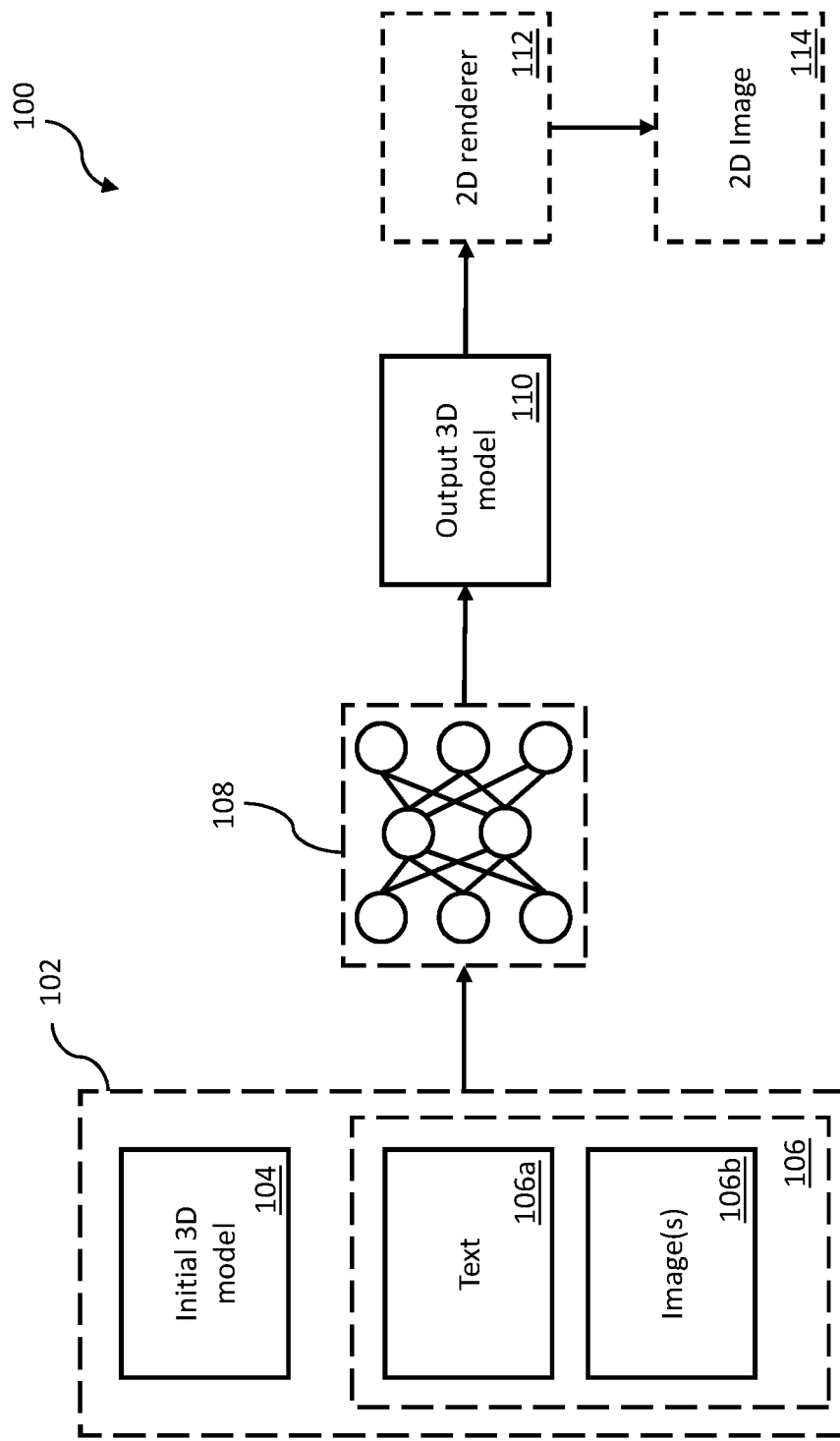
FIG. 1 shows an overview of a method for generating three-dimensional models using a machine-learned model.

FIG. 1 shows an overview of a method 100 for generating three-dimensional models using a machine-learned model. A set of input data 102 comprising an initial 3D model 104 and one or more sets of conditioning data 106 describing one or more target properties is input into a machine learning model 108. The machine learning model 108 processes the input data 102 to generate an output 3D model 110 with the target properties specified by the conditioning data 106. In some implementations, a 2D renderer 112 may be applied to the output 3D model 110 to generate rendered 2D images of the output 3D model 110.

As an example, the initial 3D model 104 may comprise a 3D model of a plane. The one or more sets of conditioning data 106 may comprise the text description 106a "a glider in wood with a light colour" and one or more images 106b of a wood texture. The 3D model of a plane, the text descriptor and the images of wood texture are input into the machine learning model 108, which processes them according to learned parameters to generate an output 3D model 110 of a glider with a light wood texture.

The initial 3D model 104 and output 3D model 110 are representations of 3D objects. They may, for example, comprise a mesh (e.g. an RGB mesh), a point cloud, a voxel representation, a displacement map or the like. The 3D models 104, 110 may further comprise a texture map.

The conditioning data 106 may comprise text data 106a describing a target property of the output 3D model 110. The text data 106a comprises a text description of the desired output 3D model 110. For example, the text data 106a may describe an object type, e.g. a room, a vehicle, a person etc. The text data may further describe materials, textures, colours, layouts, actions etc. of the object.

The conditioning data may alternatively or additionally comprise one or more images 106b relating to target properties of the output 3D model 110. For example, the one or more images 106b may comprise images of textures, surface details and/or decorations, or other target features desired in the output 3D model 110. The one or more images 106b may alternatively or additionally compromise style images indicating a desired style of the output 3D model, e.g. an image in the style of a particular artist or a building/room in particular architectural style.

The machine learning model 108 may be any machine learning model suitable for generating 3D models as an output. For example, the machine learning model 108 may be a neural network, such as a convolutional neural network or mesh convolutional neural network. The machine learning model 108 may be an autoregressive model, such as an autoregressive transformer model. Examples of such models are described in "ATISS: Autoregressive Transformers for Indoor Scene Synthesis" (D. Paschalidou et al., arXiv: 2110.03675v1) and "SceneFormer: Indoor Scene Generation with Transformers" (X. Wang et al., arXiv:2012.09793), the contents of both of which are incorporated herein by reference in their entirety. The machine learning model 108 may be defined by a network structure and a set of learned parameters, θ, e.g. weights and biases of a neural network. The parameters may have been learned using the training method described in FIG. 2.

In some implementations, a differentiable renderer 112 may be used to render the 3D model into one or more 2D images 114. A differentiable renderer 112 is a differentiable function that converts a 3D model into a 2D image 114. Example of such renderers are described in "Differentiable Rendering: A Survey" (H. Kato et al., arXiv:2006.12057), the contents of which are incorporated herein by reference. The 3D model may be rendered for use in a video game.

Figure 2:
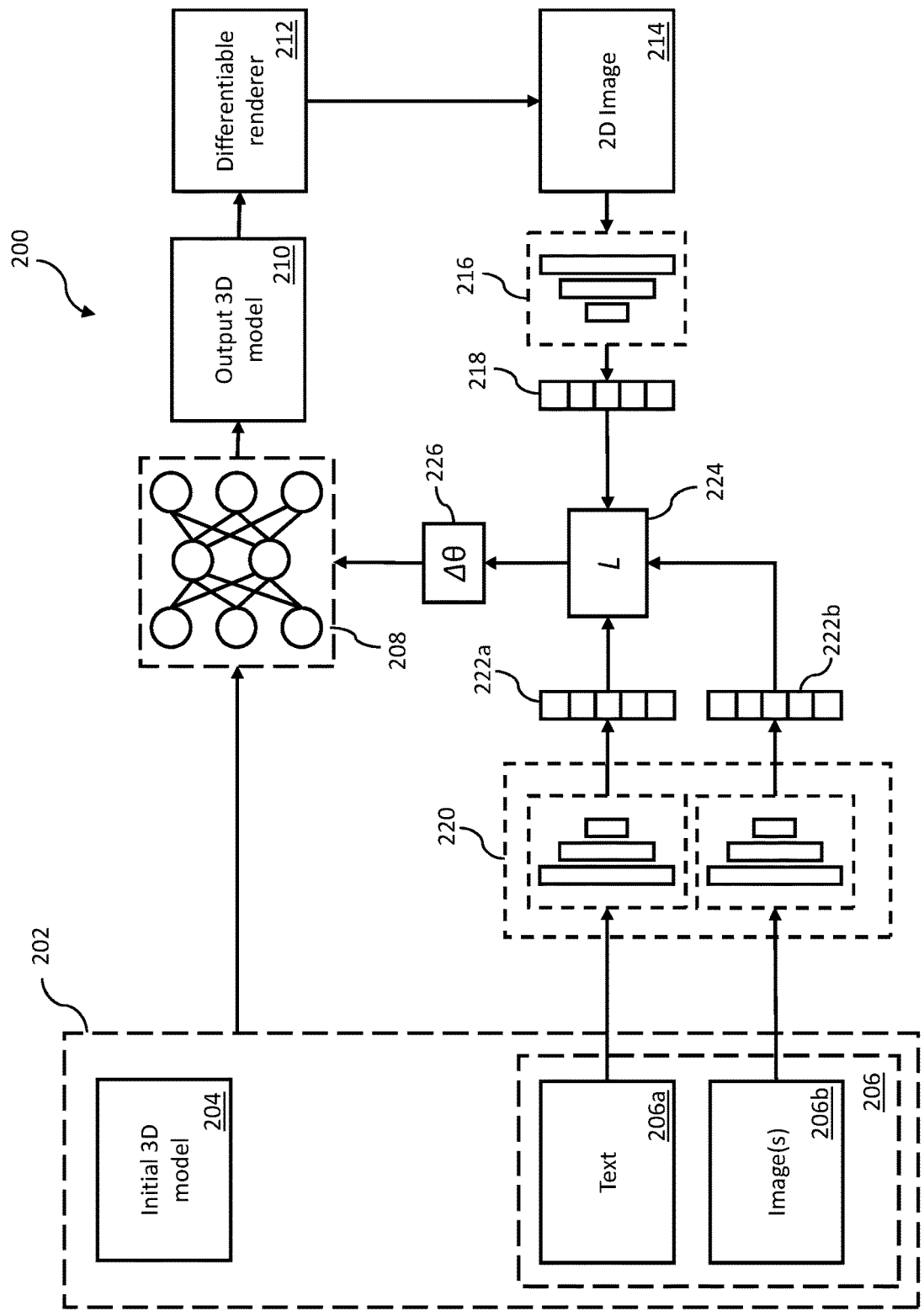
FIG. 2 shows an overview of a method for training a machine learning model to generate three-dimensional models.

FIG. 2 shows an overview of a method 200 for training a machine learning model to generate three-dimensional models. A training example 202 is obtained from a set of training data. The training example 202 comprises an initial 3D model of an object 204 and one or more sets of conditioning data 206 describing one or more target properties. The training example is input into a machine learning model 208, which processes the training example 202 based on current values of parameters, θ, of the machine learning model 208 to generate an output 3D model 210. The output 3D model 210 is rendered into one or more 2D images 214 using a differentiable renderer 212. In this respect, the method 200 of FIG. 2 is similar to the method 100 of FIG. 1.

The one or more 2D images 214 are input into a pre-trained image encoder 216 (also referred to herein as an "image embedding model"), which processes them to generate respective image embeddings 218 of the output 3D model 210. The conditioning data 206 is input into one or more pre-trained encoder models 220, which generate respective embeddings 222 of the conditioning data 206. For example, where the conditioning data comprises text data 206a, a pre-trained text encoder 220a (also referred to herein as an "text embedding model") is used to generate a text embedding 222a from the text data 206a. Where the conditioning data comprises one or more images 206b, a pre-trained image encoder 220a (also referred to herein as an "image embedding model") is used to generate respective image embeddings 222b from the one or more images 206. The pretrained image encoder 220a may be the same as the image encoder as the pre-trained image encoder 216 used to generate the embedding of the 2D image 214.

The pretrained image encoder 216, 220b and pretrained text encoder 220a have been trained to embed images and text respectively into a shared latent space (also referred to as a shared embedding space). The shared latent space encodes semantically similar text and images into similar embedding vectors, e.g. semantically similar text and images are encoded into embedding vectors with a small distance between them in embedding space. The pretrained text encoder 220a may, for example, be a transformer model. The pretrained image encoder 216 may, for example, be a vision transformer model or a ResNet model.

Contrastive learning may be used to pre-train the encoder models. An example of such encoder models and how to train them is described in "Learning Transferable Visual Models From Natural Language Supervision" (A. Radford et al., arXiv:2103.00020, the contents of which are incorporated herein by reference in their entirety), and may be referred to as "Contrastive Language-Image Pre-training" (or "CLIP").

The one or more image embeddings 218 of the output 3D model 210 are compared to the embeddings 222 of the conditioning data 206 using a loss function 224, L. Based on the comparison, parameter updates 226 for the machine learning model 208 are determined, and used to update the machine learning model 208. A optimisation routine, such as stochastic gradient descent, may be applied to the loss function 224 to determine the parameter updates 226. Gradients may be backpropagated through the encoder models 216, 220 and the differentiable renderer 212.

The loss function 224 may comprise a sematic similarity loss between the one or more image embeddings 218 of the output 3D model 210 and the embedding 220a of the text description 206a. Alternatively or additionally, the loss function 224 may comprise a sematic similarity loss between the one or more image embeddings 218 of the output 3D model 210 and the embedding 220b of the conditioning images 206b. The semantic similarity loss may be based on a distance and/or angle between embedding vectors 216, 222 in the shared latent space. For example, the semantic similarity loss may be an $L_1$ or $L_2$ loss, or a cosine similarity loss.

The loss function 224 may alternatively or additionally comprise a style loss between the one or more image embeddings 218 of the output 3D model 210 and the embedding 220a of the conditioning images 206b. The style loss may, for example, be a gram matrix loss.

The objective function may, in some implementations, be a weighted sum of the semantic losses and the style loss, with each component of the objective function (e.g. the text sematic similarity loss, the image sematic similarity loss and the style loss) being associated with a corresponding weight. The weights may be user defined. Such an objective function allows the method to achieve diverse style generation.

The method 200 may be iterated over a set of training data to train the machine-learning model 208 to generate 3D models based on unseen input 3D models and conditional inputs. The method 200 may be iterated until a threshold condition is satisfied, such as a threshold number of iterations/training epochs and/or a threshold performance on a test dataset being satisfied.

Alternatively, the method may be iterated over the same set of input data 202 to fine-tune the model to output a particular 3D model 210. The method 200 may be iterated for a threshold number of iterations and/or until the objective function converges to within a predefined threshold value.

Figure 3:
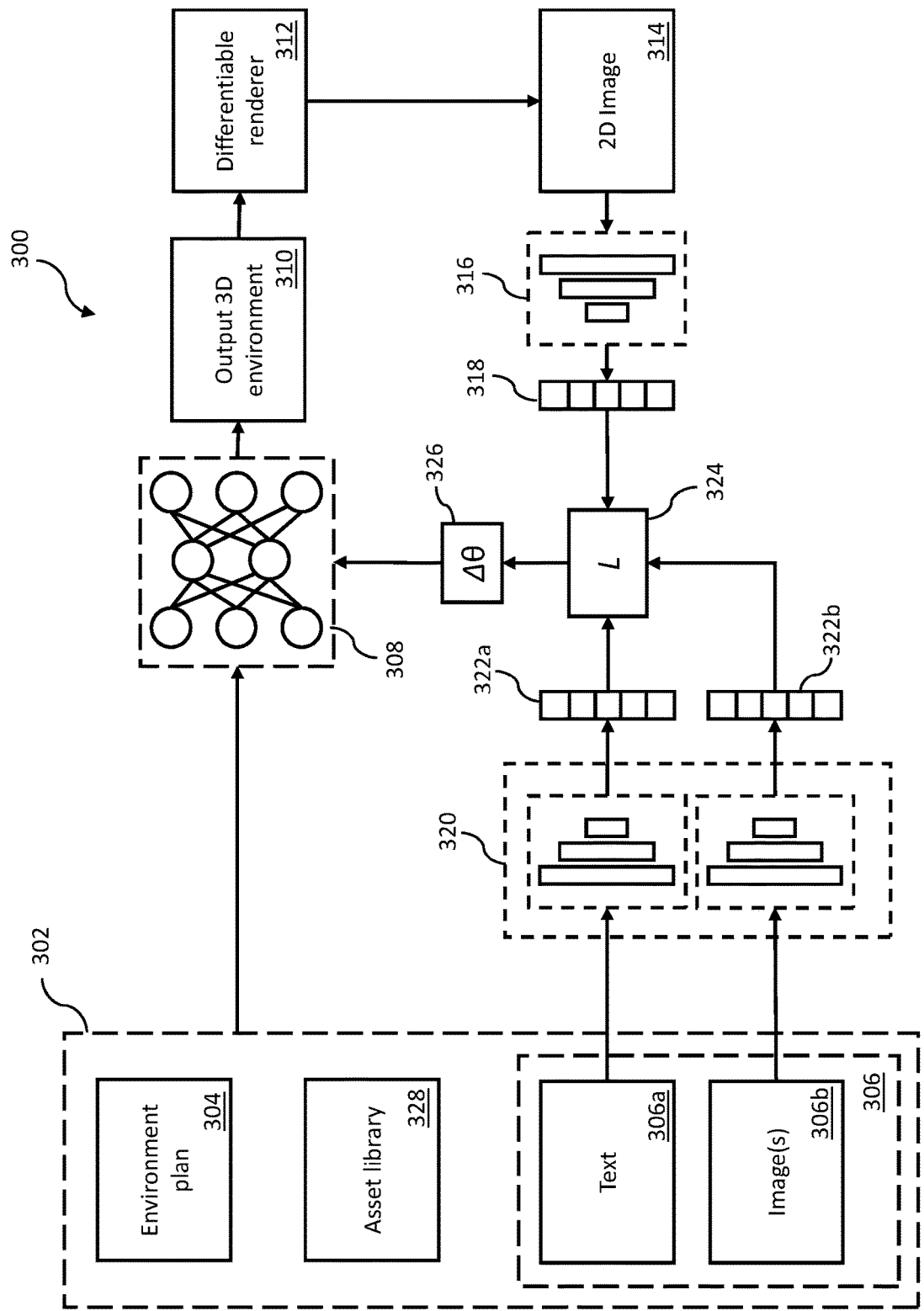
FIG. 3 shows an example of using/training a machine learning model to generate a three-dimensional model of a room.

FIG. 3 shows an example of using/training a machine learning model to generate a three-dimensional model of an environment, e.g. a room. In such examples, the input data 302 comprises a environment plan 304, such as a room floor plan or 3D model of a room space. The input data 302 further comprises an asset library 328 comprising a plurality of 3D assets that may be placed in the environment, e.g. furniture models, plant models or the like. The input data 302 further comprises conditioning data 306, comprising a textual description 306a and/or one or more images 306b of target properties of the environment. The target properties of the environment may, for example, comprise a target environment type (e.g. a room identity, such as a bedroom or kitchen), a target environment layout (e.g. a description of key object locations in the environment) and/or an environment style (e.g. a décor style). As an example, the text description 306a may be "This room has a wardrobe cabinet and a double bed. There is a desk to the left of the double bed"

The input data 302 is input into the machine-learned model 308. The machine-learned model 308 may, for example, be an autoregressive transformer model. The machine-learned model 308 processes the input data 302 based on current values of its parameters to generate an output 3D environment 310. The output 3D environment 310 is rendered into one or more 2D images 314 using a differentiable renderer 312.

Embeddings 318 of the one or more 2D images 314 are generated using a pre-trained image embedding model 316. Embeddings 322 of the conditional inputs 306 are also generated using corresponding embedding models 322, as described above in relation to FIG. 2. The conditional embeddings 322 are compared to the embeddings of the generated environment 318 using a loss/objective function 324, and parameter updates 326 for the machine-leaning model 308 determined based on the loss/objective function, as described in relation to FIG. 2.

Figure 4:
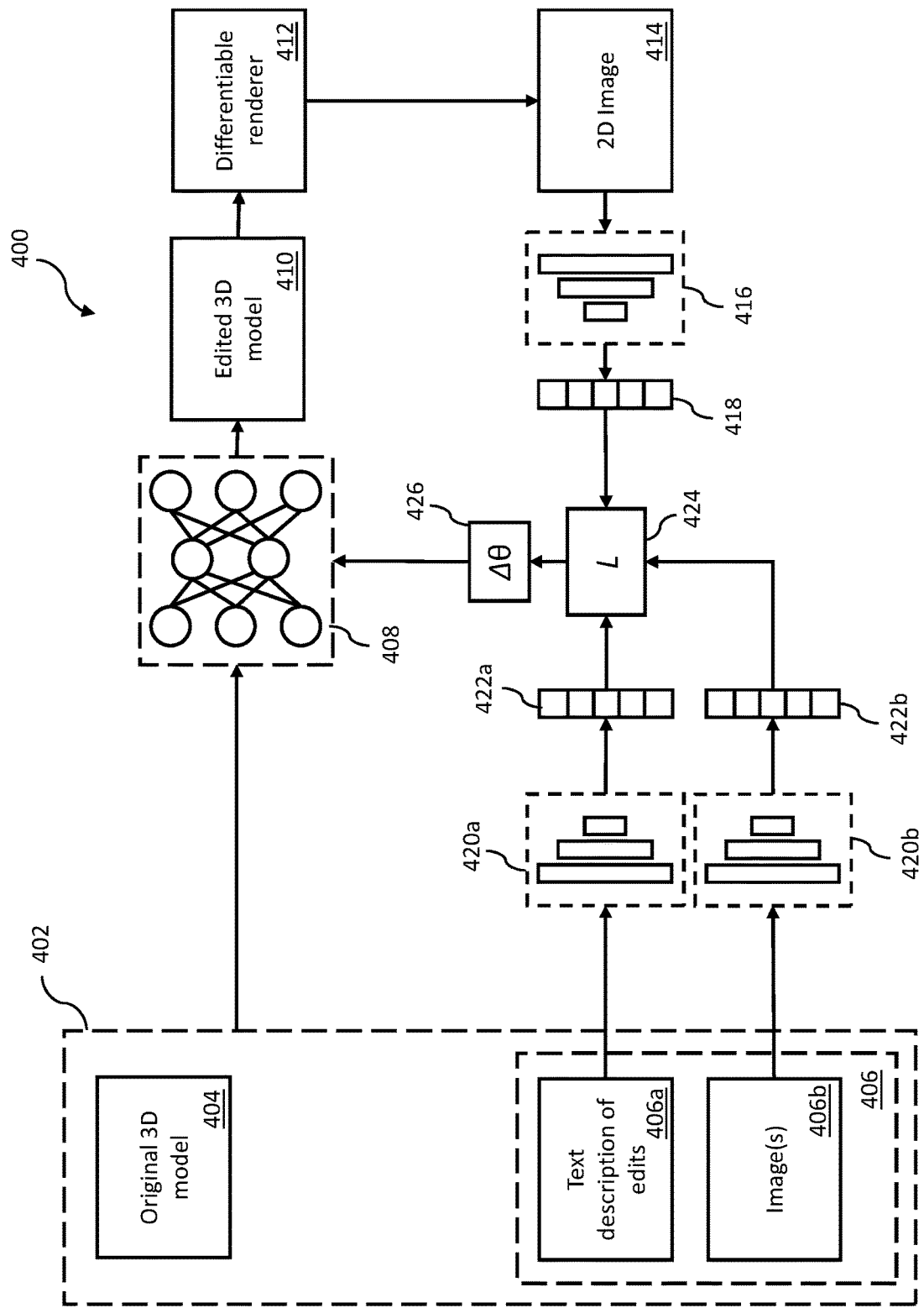
FIG. 4 shows an example of using/training a machine learning model to edit an existing three-dimensional model.

FIG. 4 shows an example of using/training a machine learning model to edit an existing three-dimensional model. It is common for the daily workflow of a designer to require specific component editing of a model, e.g. to change legs of chair or edit the desk surface but keep rest of the 3D model intact. The methods described herein can be used as a tool to allow the designer to freely edit components of the object using a text descriptor. In these examples, the embedding networks used to train the machine-learning model 408 may be based on a pixel-text matching model, rather than an image-text matching model. An example of such a model is DenseCLIP, as described in "DenseCLIP: Language-Guided Dense Prediction with Context-Aware Prompting" (Y. Rao et al., arXiv:2112.01518), the contents of which are incorporated herein by reference in their entirety.

In such examples, the input data 402 comprises a 3D model of an object to be edited 404 and conditional data 406 comprising a text description 406a of desired edits/changes to the 3D model 404. The conditional data 406 may further comprise one or more images 406b indicative of target properties of the edits described by the text 406a, e.g. textures, colours or the like.

The input data 402 is input into the machine learning model 408, which processes the input data 402 according to current values of its parameters to generate an edited version 410 of the initial 3D model 404 conditioned on the text input 406a and, if present, the one or more conditioning images 406b. At inference time, the method 400 may end here, and the edited 3D model may be output.

At training time, the method 400 may continue by rendering the edited 3D model 410 into one or more 2D images 414 using a differentiable renderer 412. The rendered 2D images 414 are input into an image encoder 416, which generates an image embedding 418 from them. The text conditioning input 406a is input into a text encoder 420a, which generates a text embedding 422a from them. If image data 406b is also present in the conditioning data 406, the image conditioning input 406b is input into an image encoder 420b, which generates a further image embedding 422b from them. The image encoder 420b may be the same as the image encoder 416. Th image encoders 416, 420b and text encoder 420a produce embedding vectors in a shared text and image latent space.

The embeddings of the generated 2D images 418 are compared to the text embeddings 422a and, if present, the conditioning image embeddings 422b using a loss/objective function 424. The loss/objective function 424 may be a dense context-aware mask
   similarity loss. An example of such a loss is described in
      "DenseCLIP: Language-Guided Dense Prediction with
      Context-Aware Prompting" (Y. Rao et al., arXiv: 2112.01518).

Based on the value of the loss/objective function, parameter updated 426 for the machine-learned model 408 may be determined and applied to the machine-learning model 408, as described in relation to FIG. 2. For example, an optimisation routine, such as stochastic gradient descent, may be applied to the loss/objective function 424 to determine the parameter updates 426.

Figure 5:
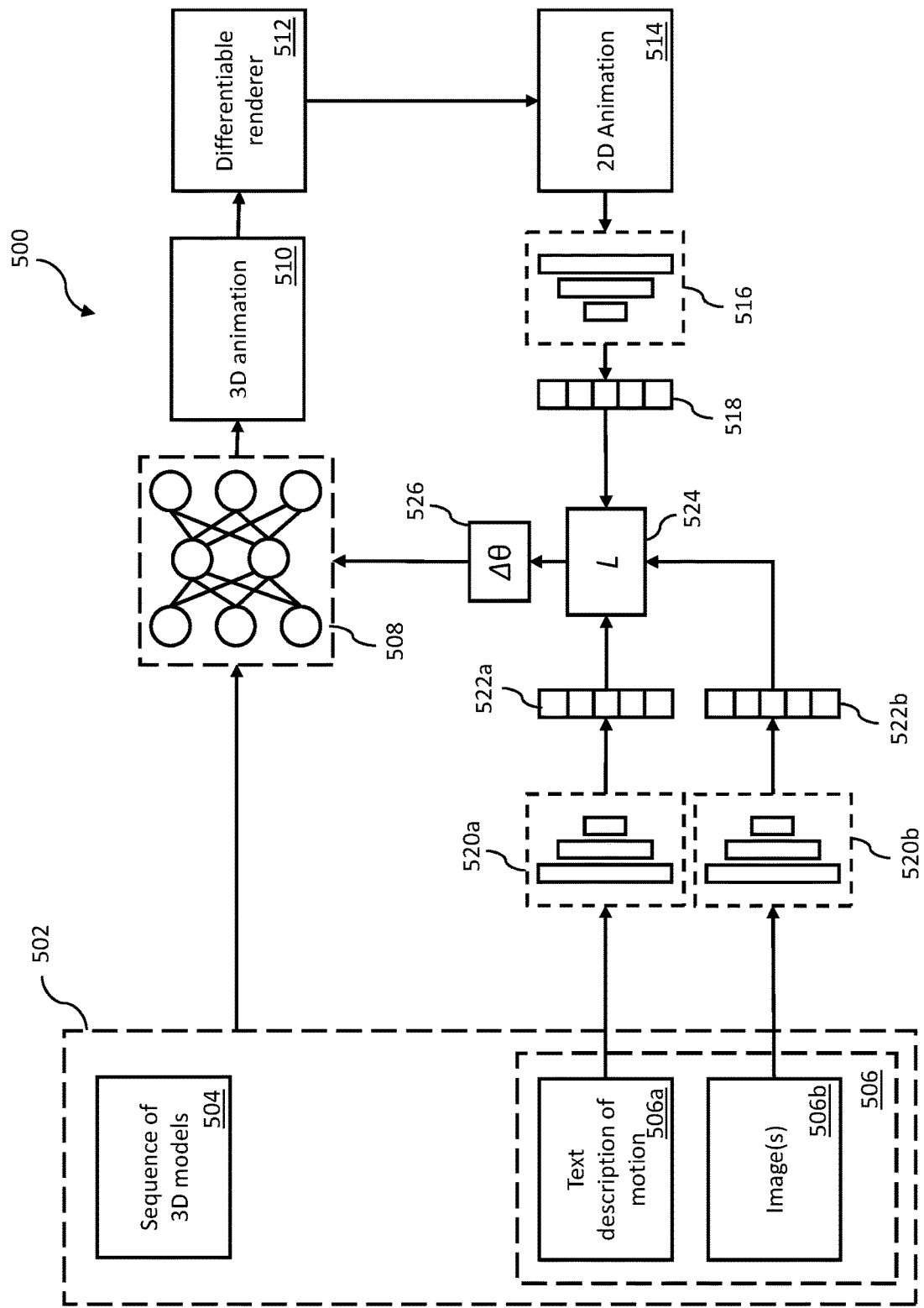
FIG. 5 shows an example of using/training a machine learning model to generate an animation of a three-dimensional model.

FIG. 5 shows an example of using/training a machine learning model to generate an animation of a three-dimensional model, e.g. a human. When creating 3D animations, an animator typically manually edits the motion segment by segment. Using the systems, methods and apparatus described herein, 3D animations can be generated conditioned on a text input using a 3D motion generation network to help generate artistic human motion. For example, given the text "a video of a person reaching the static basketball", matched motion sequences can be generated. In addition to that, human-object interactions may be incorporated into the text input, e.g. touch the static object of the scene and so on.

Contrastive learning may be used as a text-video guidance to generate human motion videos using the differential rendering pipeline with corresponding skeletons and skinning mesh. Based on it, the designer can freely set any descriptors for motion generation. An example of such a contrastive learning approach for videos is described in "VideoCLIP: Contrastive Pre-training for Zero-shot Video- Text Understanding" (H. Xu et al., arXiv:2109.14084), the contents of which are incorporated herein by reference in their entirety.

In such embodiments, the input data 502 to the machine-learning model 508 comprises a sequence of 3D models 504 of an object to be animated. For example, the sequence of 3D models 504 may be a sequence of humanoid skeletons, for example, each described by a parametric human model. The input data 502 further comprises a textual description 506a of a desired motion for the animation, e.g. "a video of a person reaching the static basketball". The textual description 506a may, for example, specify an action (e.g. running, standing, jumping etc.), a style (e.g. happy, sad, angry etc.) and/or an object contact (e.g. touch an object nearby the chairs etc.). The input data 502 may further include one or more images 506b and/or static 3D objects (e.g. a basketball, following the example above).

The input data 502 is input into a 3D motion generation network 508, which processes the input data 502 according to current values of its parameters to generate an output 3D animation 510. The output 3D animation 510 comprises a sequence of 3D models performing an action, e.g. a sequence of human models performing the action described in the textual description 506a. The 3D animation 510 may further comprise texture maps, skins, blending information or the like.

At inference time, the method may stop here, or after the rendering process described below. At training time, the method may proceed with the rendering process and subsequent model parameter updates.

The 3D animation 510 may be rendered into one or more 2D animations 514 using a differentiable renderer 512. The one or more 2D animations 514 may each show the 3D animation 510 from a different camera position and orientation. A respective embedding 518 of each of the one or more 2D animations is generated using a pre-trained video encoder model 516, e.g. a VideoCLIP video/images encoder. The text description 506a of the desired motion is processed by a pre-trained text encoder 520a, e.g. a VideoCLIP text encoder, to generate a text embedding 522a. If present, the one or more images 506b and/or static 3D objects may also be embedded using an image encoder 520b to generate one or more image embeddings 522b.

The embeddings of the one or more 2D animations 518 are compared to the text embedding 522a and, if present, the one or more image embeddings 522b, using a loss/objective function 524. The loss/objective function 524 may, for example be a text-video semantic similarity loss. Based on the value of the loss/objective function, parameter updated 526 for the machine-learned model 508 may be determined and applied to the machine-learning model 508, as described in relation to FIG. 2. For example, an optimisation routine, such as stochastic gradient descent, may be applied to the loss/objective function 524 to determine the parameter updates 526.

Figure 6:
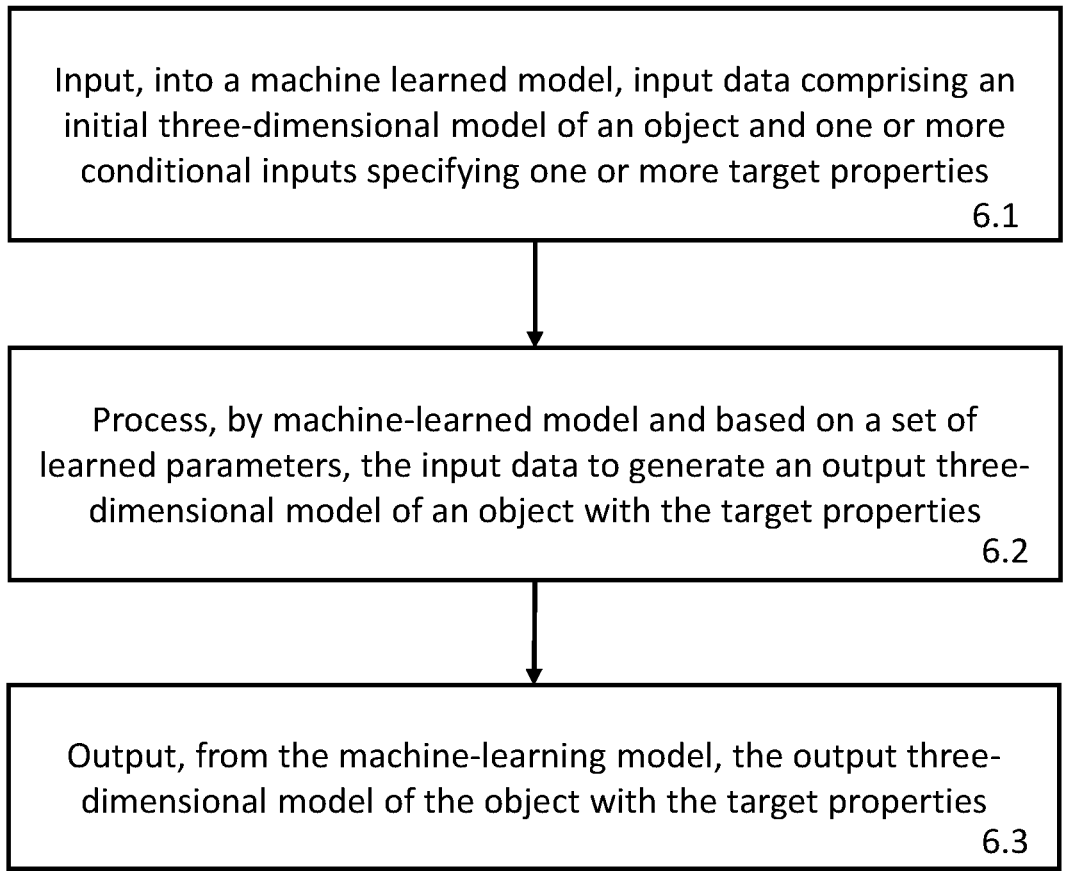
FIG. 6 shows a flow diagram of an example method for generating three-dimensional models using a machine-learned model.

FIG. 6 shows a flow diagram of an example method for generating three-dimensional models using a machine-learned model. The method may be performed by one or more computers operating in one or more locations.

At operation 6.1, input data comprising an initial 3D model of an object and one or more conditional inputs specifying one or more target properties are input into a machine-learned model. The one or more conditional inputs comprises a text description and/or one or more images.

The initial 3D model may comprise a single 3D model or a sequence of 3D models. The 3D models may, for example, be in the form of a mesh, a point cloud, a set of voxels or the like. The initial 3D model may be a model of an object, a model of an environment, or a sequence of 3D models of an object.

The conditional input may be a text description of the desired output 3D model, including for example, an identity of an object in the model, properties of the object in the model, an environment layout, and/or a motion of the object. The conditional input may further comprise images of one or more target properties of the object, e.g. textures, colors, object parts or the like.

At operation 6.2, the machine-learned model processes the input data based on a set of learned parameters to generate an output 3D model of an object with the target properties. The machine-learned model may have been trained using any of the method described herein to generate 3D models from an initial 3D model and conditioning data.

At operation 6.3, the output 3D model of the object with the target properties is output from the machine-learned model. The output 3D model may comprise a mesh, a point cloud, a set of voxels or the like. The output 3D model may further comprise one or more texture maps, deformation maps, bump maps or the like.

Figure 7:
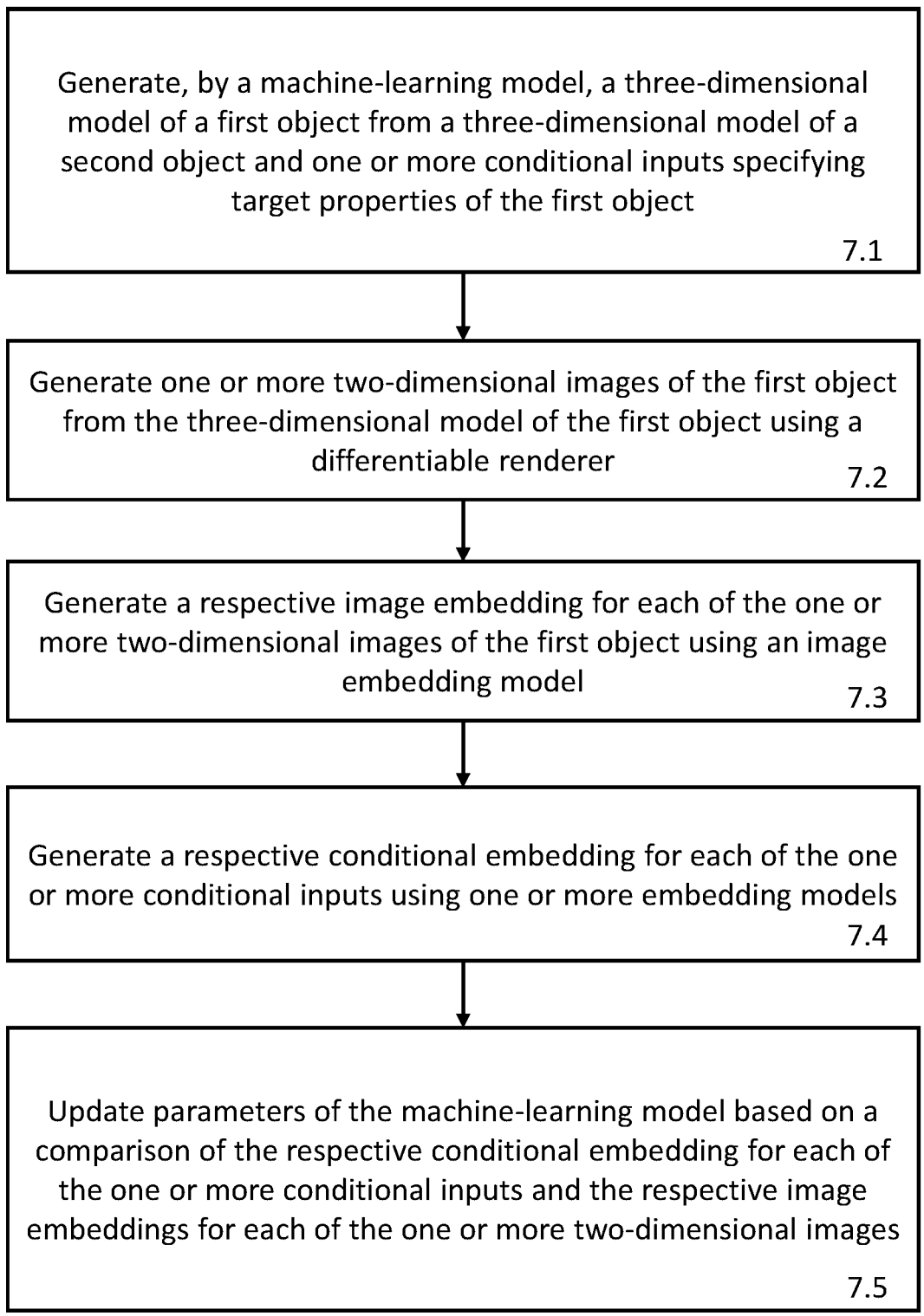
FIG. 7 shows flow diagram of a method for training a machine learning model to generate three-dimensional models.

FIG. 7 shows flow diagram of a method for training a machine learning model to generate three-dimensional models. The method may be performed by one or more computers operating in one or more locations.

At operation 7.1, a three-dimensional model of a target object is generated from a three-dimensional model of an initial object and one or more conditional inputs specifying target properties of the target object. The one or more conditional inputs comprises an image and/or a text description.

The initial 3D model may comprise a single 3D model or a sequence of 3D models. The 3D models may, for example, be in the form of a mesh, a point cloud, a set of voxels or the like. The initial 3D model may be a model of an object, a model of an environment, or a sequence of 3D models of an object.

The conditional input may be a text description of the desired output 3D model, including for example, an identity of an object in the model, properties of the object in the model, an environment layout, and/or a motion of the object. The conditional input may further comprise images of one or more target properties of the object, e.g. textures, colors, object parts or the like.

The output 3D model may comprise a mesh, a point cloud, a set of voxels or the like. The output 3D model may further comprise one or more texture maps, deformation maps, bump maps or the like.

At operation 7.2, one or more two-dimensional images of the target object are generated from the three-dimensional model of the target object using a differentiable renderer. The differentiable renderer is a differentiable function that maps a 3D model onto a 2D image.

At operation 7.3, a respective image embedding for each of the one or more two-dimensional images of the target object are generated using an image embedding model. The image embedding model takes as input one or more images, e.g. a single image or a sequence of images forming an animation, and outputs an embedding vector/tensor representing the one or more images. The embedding vector/tensor has a lower number of dimensions than the input image.

The image embedding model may be a neural network. For example, the image embedding model may be a convolution neural network. The convolution neural network may have one or more skip connections, e.g. a ResNet.

At operation 7.4, a respective conditional embedding for each of the one or more conditional inputs is generated using one or more embedding models.

For a text input, a text embedding model is used that takes as input the text description and outputs an embedding vector/tensor representing the text description. The text embedding model may, for example, be a transformer model.

For image inputs, an image embedding model is used that takes as input one or more images and outputs an embedding vector/tensor representing the one or more images. The image embedding model may be the same model used to determine the embeddings of the 2D images rendered from the generated 3D object.

The respective conditional embeddings for each of the one or more conditional inputs and respective image embeddings for each of the one or more two-dimensional images of the target object occupy a shared latent space, i.e. the image and text embedding models have been pre-trained to embed images and text into the same embedding space.

At operation 7.5, parameters of the machine-learning model are updated based on a comparison of the respective conditional embedding for each of the one or more conditional inputs and the respective image embeddings for each of the one or more two-dimensional images.

The comparison may be made using an objective function (also referred to as a loss function). An objective value/loss may be determined using the objective function, e.g. by determining a loss between the conditional embeddings and the image embeddings for each of the one or more two-dimensional images of the generated object using the objective function. The parameter updates for the machine-learning model may be determined based on the value of the objective function. For example, an optimisation routine, such as stochastic gradient descent, may be applied to the objective function to determine the parameter updates. Gradients of the objective function may be backpropagated through the differentiable renderer.

The objective function may comprise one or more sematic similarity losses, e.g. a loss function based on distances between embeddings in the shared latent space. The sematic similarity loss may comprise a text semantic similarity loss, measuring distances in the shared latent space between the embedding of the text description input and the embedding of the rendered two-dimensional images of the generated object. The sematic similarity loss may alternatively or additionally comprise an image semantic similarity loss, measuring distances in the shared latent space between the embedding of the input images and the embedding of the rendered two-dimensional images of the generated object. The sematic similarity loss may, for example, be based on an $L_2$ loss, an $L_1$ loss or a cosine similarity loss.

The objective function may alternatively or additionally comprise a style loss measuring a difference in style between the rendered two-dimensional images of the generated object and the input conditioning images. The style loss may be based on a gram matrix loss.

The objective function may, in some implementations, be a weighted sum of the semantic losses and the style loss.

Operations 7.1 to 7.5 may be iterated until a threshold condition is satisfied. The threshold condition may be a threshold number of training epochs, a convergence of the objective function, and/or a threshold model performance being reached.

The iterations may be performed over a set of training data comprising a plurality of training examples, each training example comprising an initial three-dimensional object and a set of conditioning data. Alternatively, the iterations may be performed over the same input data to finetune the parameters of the machine learning model to generate a particular 3D model.

Figure 8:
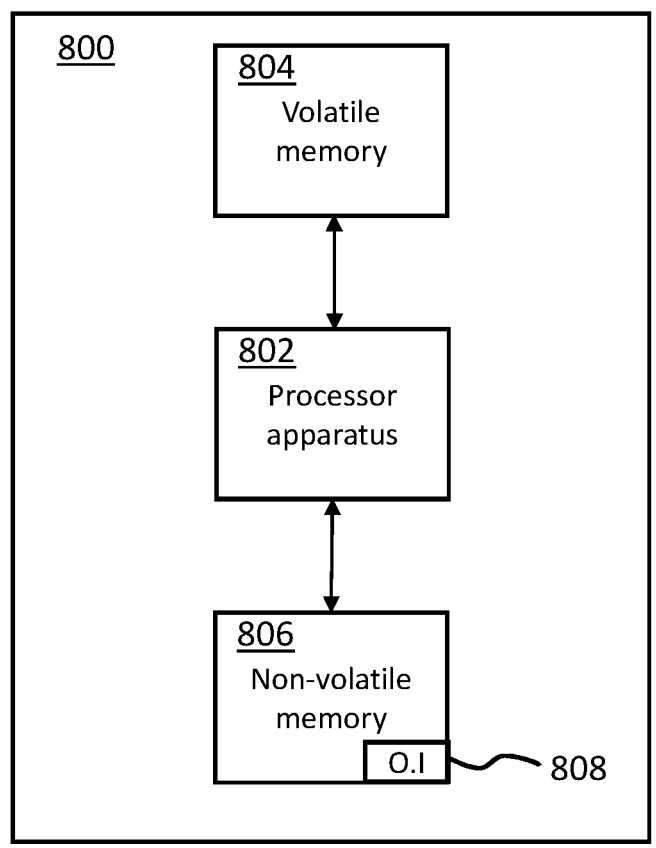
FIG. 8 shows a schematic overview of a computing system.

FIG. 8 shows a schematic overview of a computing system 800 for performing any of methods described herein. The system/apparatus shown is an example of a computing device. It will be appreciated by the skilled person that other types of computing devices/systems may alternatively be used to implement the methods described herein, such as a distributed computing system.

The apparatus (or system) 800 comprises one or more processors 802. The one or more processors control operation of other components of the system/apparatus 800. The one or more processors 802 may, for example, comprise a general purpose processor. The one or more processors 802 may be a single core device or a multiple core device. The one or more processors 802 may comprise a central processing unit (CPU) or a graphical processing unit (GPU). Alternatively, the one or more processors 1102 may comprise specialized processing hardware, for instance a RISC processor or programmable hardware with embedded firmware. Multiple processors may be included.

The system/apparatus comprises a working or volatile memory 804. The one or more processors may access the volatile memory 804 in order to process data and may control the storage of data in memory. The volatile memory 804 may comprise RAM of any type, for example Static RAM (SRAM), Dynamic RAM (DRAM), or it may comprise Flash memory, such as an SD-Card.

The system/apparatus comprises a non-volatile memory 806. The non-volatile memory 806 stores a set of operation instructions 808 for controlling the operation of the processors 802 in the form of computer readable instructions. The non-volatile memory 806 may be a memory of any kind such as a Read Only Memory (ROM), a Flash memory or a magnetic drive memory.

The one or more processors 802 are configured to execute operating instructions 808 to cause the system/apparatus to perform any of the methods described herein. The operating instructions 808 may comprise code (i.e. drivers) relating to the hardware components of the system/apparatus 800, as well as code relating to the basic operation of the system/apparatus 800. Generally speaking, the one or more processors 802 execute one or more instructions of the operating instructions 808, which are stored permanently or semi-permanently in the non-volatile memory 806, using the volatile memory 804 to temporarily store data generated during execution of said operating instructions 808.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 8, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer implemented method comprising:
   for a plurality of iterations:
      generating, by a machine-learning model, a three-dimensional model of an object from a three-dimensional model of an initial object and one or more conditional inputs specifying target properties of the generated three-dimensional model of the object, wherein the one or more conditional inputs comprises an image and/or a text description, wherein the three-dimensional model of the initial object and the one or more conditional inputs are selected from a set of training data comprising a plurality of training examples, each training example comprising a respective initial three-dimensional model of an object and a respective one or more sets of conditioning data;
      generating one or more two-dimensional images of the generated object from the three-dimensional model of the generated object using a differentiable renderer;
      generating a respective image embedding for each of the one or more two-dimensional images of the generated object using an image embedding model;
      generating a respective conditional embedding for each of the one or more conditional inputs using one or more embedding models, wherein the respective conditional embeddings for each of the one or more conditional inputs and respective image embeddings for each of the one or more two-dimensional images of the generated object occupy a shared latent space; and
      updating parameters of the machine-learning model based on a comparison of the respective conditional embedding for each of the one or more conditional inputs and the respective image embeddings for each of the one or more two-dimensional images of the generated object.

2. The method of claim 1, wherein updating parameters of the machine-learning model based on a comparison of the respective conditional embedding for each of the one or more conditional inputs and the respective image embeddings for each of the one or more two-dimensional images of the generated object comprises:
   determining a loss between the conditional embeddings and the image embeddings for each of the one or more two-dimensional images of the generated object using an objective function; and
   determining parameter updates to the parameters of the machine-learning model based on the objective function,
   wherein the objective function comprises one or more sematic similarity losses.

3. The method of claim 2, wherein:
   the conditioning input comprises an image and a text description; and
   the objective function comprises:
      a text semantic similarity loss; and
      an image sematic similarity loss.

4. The method of claim 3, wherein the objective function further comprises a style loss between a conditioning image and the one or more two-dimensional images of the generated object.

5. The method of claim 4, wherein the objective function comprises a weighted sum of the one or more sematic similarity losses and the style loss.

6. The method of claim 1, further comprising iterating the method until a threshold condition is satisfied.

7. The method of claim 1, wherein:
   the one or more conditional inputs comprises a text input describing an edit to the three-dimensional model of the initial object; and
   the three-dimensional model of the object comprises an edited version of the three-dimensional model of the initial object with the described edit.

8. The method of claim 1, wherein:
   the initial three-dimensional model is an environment;
   the one or more conditional inputs comprises a text input describing an environment layout;
   the one or more conditional inputs further comprises an asset library comprising three-dimensional models of potential objects in the environment; and
   the three-dimensional model of the object comprises a further environment with the environment layout described in the text input.

9. The method of claim 1, wherein:
   the initial three-dimensional model comprises a plurality of three-dimensional human models;
   the one or more conditional inputs comprises a text input describing an action;
   the three-dimensional model of the object comprises a three-dimensional animation of a human performing the action; and
   generating one or more two-dimensional images of the generated object from the three-dimensional model of the generated object using the differentiable renderer comprises generating one or more two-dimensional animations of the human performing the action.

10. Apparatus comprising:
one or more processors;
and a memory, the memory storing computer readable instructions that, when executed by the on more processors causes the apparatus to perform a method comprising:
for a plurality of iterations:
generating, by a machine-learning model, a three-dimensional model of an object from a three-dimensional model of an initial object and one or more conditional inputs specifying target properties of the generated three-dimensional model of the object, wherein the one or more conditional inputs comprises an image and/or a text description, wherein the three-dimensional model of the initial object and the one or more conditional inputs are selected from a set of training data comprising a plurality of training examples, each training example comprising a respective initial three-dimensional model of an object and a respective one or more sets of conditioning data;
generating one or more two-dimensional images of the generated object from the three-dimensional model of the generated object using a differentiable renderer;
generating a respective image embedding for each of the one or more two-dimensional images of the generated object using an image embedding model;
generating a respective conditional embedding for each of the one or more conditional inputs using one or more embedding models, wherein the respective conditional embeddings for each of the one or more conditional inputs and respective image embeddings for each of the one or more two-dimensional images of the generated object occupy a shared latent space; and
updating parameters of the machine-learning model based on a comparison of the respective conditional embedding for each of the one or more conditional inputs and the respective image embeddings for each of the one or more two-dimensional images of the generated object.

11. The apparatus of claim 10, wherein updating parameters of the machine-learning model based on a comparison of the respective conditional embedding for each of the one or more conditional inputs and the respective image embeddings for each of the one or more two-dimensional images of the generated object comprises:
determining a loss between the conditional embeddings and the image embeddings for each of the one or more two-dimensional images of the generated object using an objective function; and
determining parameter updates to the parameters of the machine-learning model based on the objective function,
wherein the objective function comprises one or more sematic similarity losses.

12. The apparatus of claim 11 wherein:
the conditioning input comprises an image and a text description; and
the objective function comprises:
a text semantic similarity loss; and
an image sematic similarity loss.

13. The apparatus of claim 12, wherein the objective function further comprises a style loss between a conditioning image and the one or more two-dimensional images of the generated object.

14. The apparatus of claim 13, wherein the objective function comprises a weighted sum of the one or more sematic similarity losses and the style loss.

15. The apparatus of claim 10, further comprising iterating the method until a threshold condition is satisfied.

16. The apparatus of claim 10, wherein:
the one or more conditional inputs comprises a text input describing an edit to the three-dimensional model of the initial object; and
the three-dimensional model of the object comprises an edited version of the three-dimensional model of the initial object with the described edit.

17. The apparatus of claim 10, wherein:
the initial three-dimensional model is an environment;
the one or more conditional inputs comprises a text input describing an environment layout;
the one or more conditional inputs further comprises an asset library comprising three-dimensional models of potential objects in the environment; and
the three-dimensional model of the object comprises a further environment with the environment layout described in the text input.

18. The apparatus of claim 10, wherein:
the initial three-dimensional model comprises a plurality of three-dimensional human models;
the one or more conditional inputs comprises a text input describing an action;
the three-dimensional model of the object comprises a three-dimensional animation of a human performing the action; and
generating one or more two-dimensional images of the generated object from the three-dimensional model of the generated object using the differentiable renderer comprises generating one or more two-dimensional animations of the human performing the action.

* * * * *